March 8, 1966  J. J. SENDOYKAS  3,238,819
INDEX LOCK

Filed Jan. 10, 1964  2 Sheets-Sheet 1

INVENTOR.
Jack J. Sendoykas
BY
Carnes, Dibey & Pirie
ATTORNEYS.

March 8, 1966
J. J. SENDOYKAS
3,238,819
INDEX LOCK
Filed Jan. 10, 1964
2 Sheets-Sheet 2
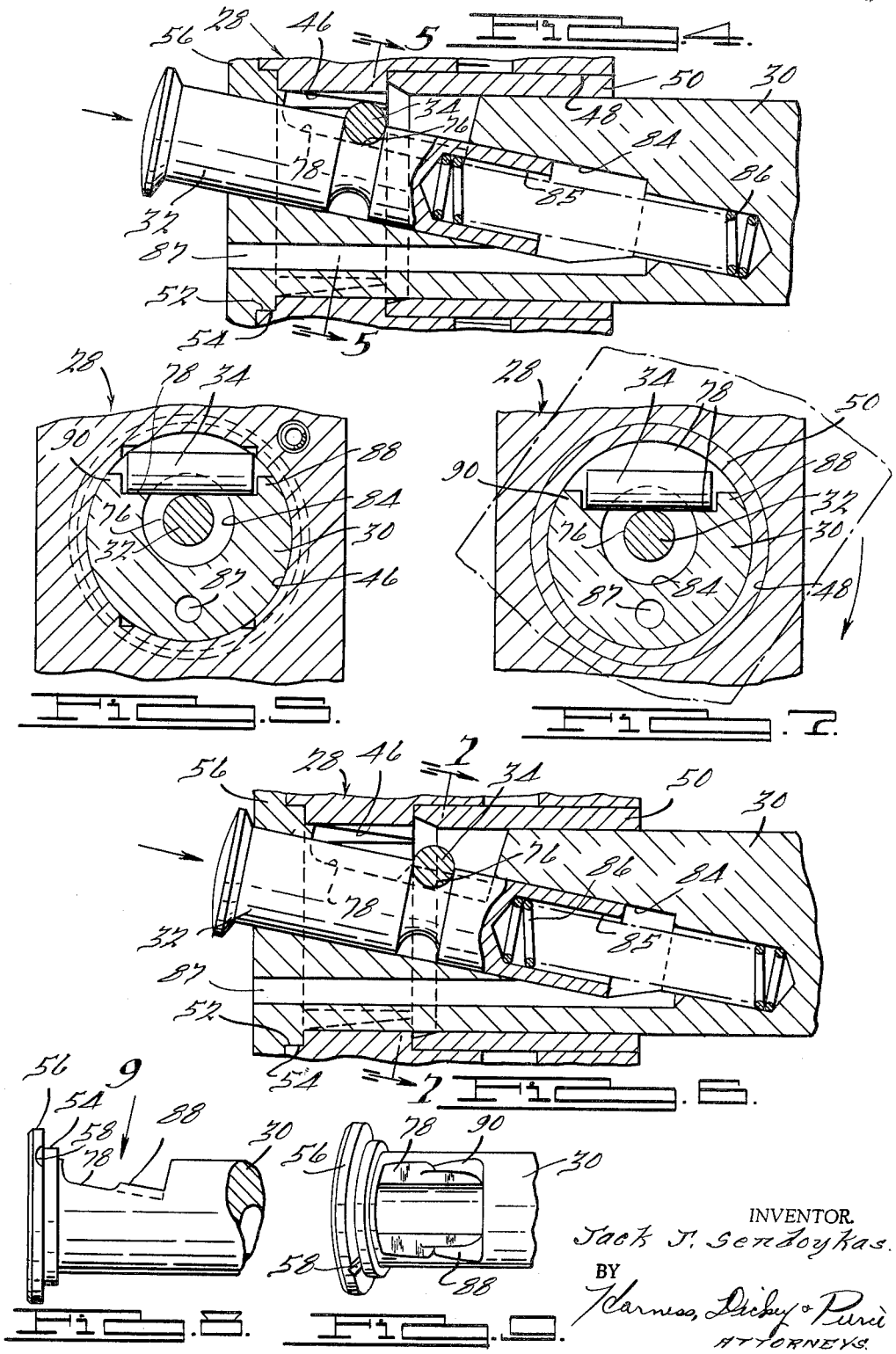
INVENTOR.
Jack J. Sendoykas.
BY
Harness, Dickey & Pierce.
ATTORNEYS.

United States Patent Office 3,238,819
Patented Mar. 8, 1966

3,238,819
INDEX LOCK
Jack J. Sendoykas, 32001 E. Jefferson Ave., Apt. 1,
St. Clair Shores, Mich.
Filed Jan. 10, 1964, Ser. No. 337,082
15 Claims. (Cl. 74—813)

This invention relates broadly to new and useful improvements in index devices and more particularly to a device of this character having a rotatable block adapted to be indexed around a central mounting spindle and to be locked securely in each index position.

Indexable mountings have many uses and applications in industry. For example, index mountings carrying work-holding or forming dies are used on welding machines to clamp and hold workpieces properly during operation of the welding electrodes. In this application, each mounting carries a plurality of different shaped work holders, is indexable to bring the work holders individually into operative position and acts to lock the selected holder securely in place.

An important object of the present invention is to provide an indexable mounting having novel means for locking the indexable parts securely in each index position.

Another object of the invention is to provide an indexable mounting of the above-mentioned character that is adaptable in manufacture to provide different numbers of index positions.

Still another object of the invention is to provide an indexable mounting that is mechanically simple in construction and correspondingly inexpensive to manufacture while at the same time providing a secure steady support for the indexable parts and that is capable of sustaining rough treatment and abuse in use.

Other objects and advantages of the invention will be apparent during the course of the following description.

In the drawing, forming a part of this specification and wherein like numerals are employed to designate like parts throughout the same;

FIGURE 4 is a view similar to FIGURE 2 but showing the parts positioned intermediate the locked and fully released positions;

FIGURE 5 is a fragmentary, transverse, vertical sectional view taken on the line 5—5 of FIGURE 4;

FIGURE 6 is a view similar to FIGURES 2 and 4 but showing the locking device and the index block fully released;

FIGURE 7 is a transverse, vertical, sectional view taken on the line 7—7 of FIGURE 6 and showing the index block in partially indexed position;

FIGURE 8 is a fragmentary, side elevational view of the spindle on which the index block is mounted; and FIGURE 9 is a top plan view of the spindle looking in the direction of the arrow 9 in FIGURE 8.

Figure 1:
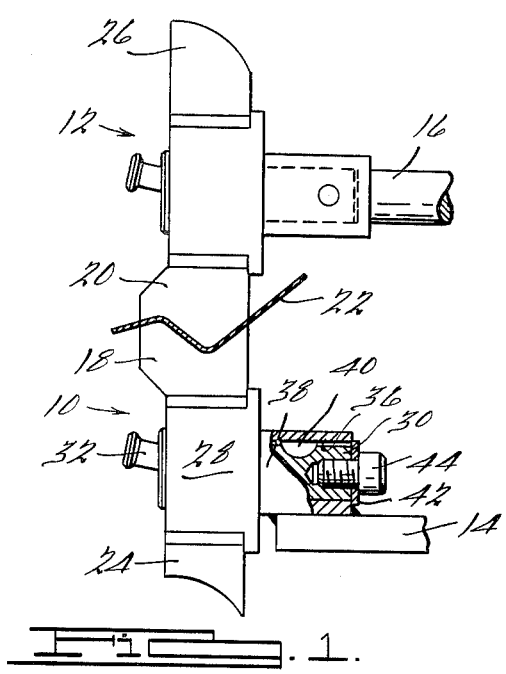
FIGURE 1 is a side elevational view showing parts in section and a typical arrangement of indexable mountings embodying the invention on a welding machine.

Reference is first made to FIGURE 1 which shows a pair of index devices 10 and 12 embodying the invention mounted in operative association on a welder or the like. In the arrangement shown, the index device 10 is welded or otherwise permanently mounted on the bed or other supporting part 14 of the welding machine and the index device 12 is carried by a movable supporting arm 16. Complementary work clamping jaws 18 and 20 on the index devices 10 and 12, respectively, cooperate to hold a workpiece 22 as shown in the drawing in operative association with welding electrodes (not shown) or other parts of the machine. Differently shaped work clamping jaws 24 and 26 are disposed on the devices 10 and 12 in diametrically opposed relation to the jaws 18 and 20, and it will be observed that the two jaws 24 and 26 can be brought into cooperative relationship with each other by turning the index devices one hundred eighty degrees.

The supporting arm 16 conveniently can be the arm 30 of the clamp shown in my copending application, Serial No. 299,353 filed August 1, 1963. When the clamp is opened, the arm 16 and the device 12 carried thereby is raised up and pulled back from the stationary device 10 to release the workpiece 22. This, of course, would normally be done after a welding or other operation had been performed on the workpiece. After the finished workpiece has been removed and a new workpiece placed on the jaw 18, the clamp is closed and as the clamping arm swings to the fully closed position it brings the jaw 20 again into position to clamp the work.

Manifestly, the two devices 10 and 12 can be indexed to bring either set of work clamping jaws into operative position when the upper device 12 is withdrawn from the lower device 10. In this manner, the apparatus shown can be easily and quickly adapted to clamp either of two differently shaped workpieces. Also, it will be readily apparent that, while the two devices 10 and 12 here shown are equipped with two sets of jaws, they can be modified to hold any reasonable number of clamping jaws or other parts.

As the two indexable devices 10 and 12 are of identical construction and operation, a detailed description of the device 10 only is given. Basically, the device comprises an index block 28 mounted for rotation on a spindle 30 and a spring-actuated locking plunger 32 which is mounted in the spindle 30 and carries a cross pin 34 that wedges the index block against the spindle to hold it in any one of several indexed positions. In the fixed mounting here provided for the device 10, the spindle 30 extends rearwardly from the index block 28 and through a cylindrical bore 36 in a mounting block 38 which is welded or otherwise fixed to the support 14. As shown, the spindle 30 is held stationary in the mounting block 38 by a Woodruff key 40 and the screw and washer 42 and 44. The key 40 holds the spindle 30 against rotation in the mounting block 38, and the washer 42 takes up end play in the spindle when the screw 44 is tightened and holds the index block 28 against the end of mounting block 28 to position the entire assembly horizontally on the supporting plate 14.

Figure 3:
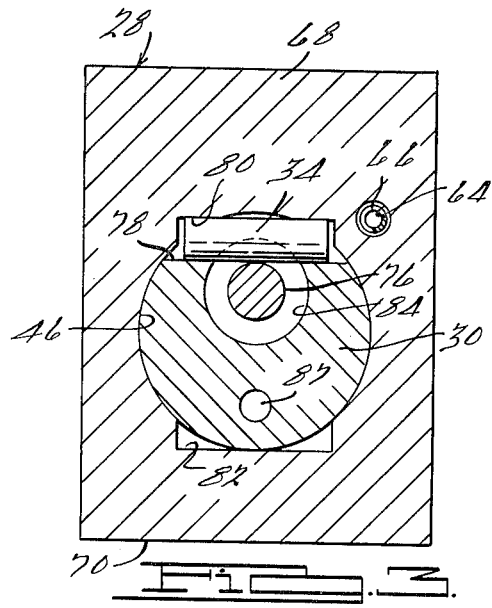
FIGURE 3 is a transverse, vertical sectional view taken on the line 3—3 of FIGURE 2.
Figure 2:
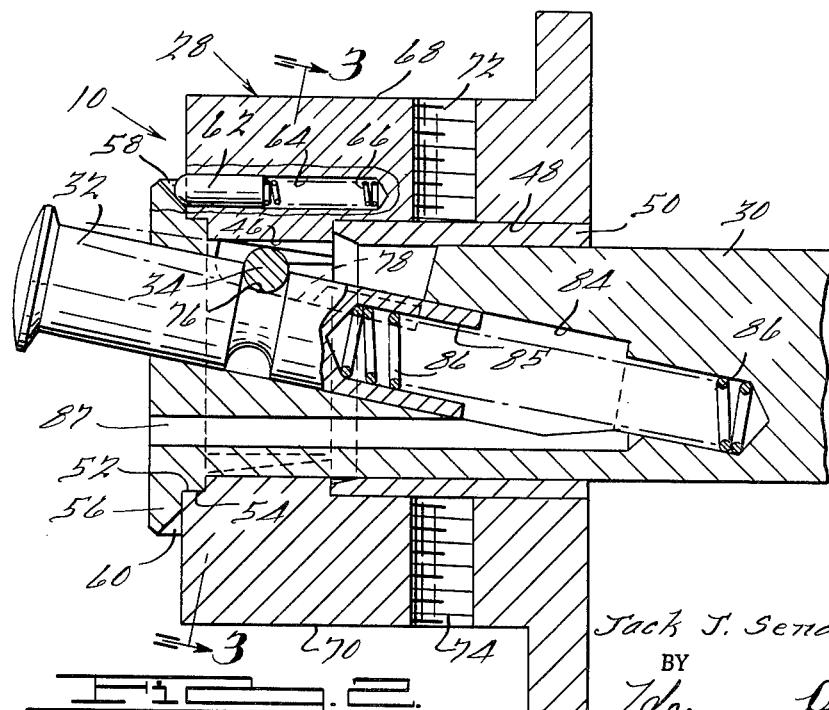
FIGURE 2 is an enlarged, longitudinal sectional view of the indexable mounting, per se.

As best shown in FIGURE 3, the index block 28 has a central opening 46 that receives the mounting spindle 30, and the rear portion of the opening 46 is countersunk as at 48 to accommodate the bushing 50, as shown in FIGURE 2. The bushing 50 has essentially the same internal diameter as the forward portion of the opening 46, and it provides a bearing support for the rear portion of the index block 28 on the spindle 30. At the forward end of the index block 28 the opening 46 is formed with a countersink 52 that receives and snugly fits an inner annular flange 54 on the forward end of the spindle 30 to provide a bearing support for the forward end of the index block 28 on the spindle. An outer annular flange or head portion 56 on the spindle 30 overlays the front face of the index block 28 around the countersink 52 and limits outward movement of the index block on the spindle. Also, the head 56 is provided at the inner side thereof with diametrically opposed recesses 58 and 60 that cooperate with a detent 62 slidably mounted in an opening 64 provided in the front face of the index block 28. A compression spring 66 confined in the opening 46 behind the detent 62 urges the latter outwardly against the head 56.

When the index block 28 is rotated or turned on the spindle 30 the detent 62 rides along the inner face of the head 56; and, as the detent moves into register with one or the other of the recesses 58 and 60 it enters the recess and resists further turning of the index block. It will be observed, however, that the outer end of the detent 62 is spherically curved (FIGURE 2) and that the recesses 58 and 60 have tapered sides (FIGURE 9) so that the detent easily is cammed inwardly to release the head 56 if sufficient torque is applied to the index block 28. In practice, the two recesses 58 and 60 determine the two index positions of the index block 28 and the jaws 18 and 24 are arranged on the block 28 so as to be positioned properly with respect to the upper index device 12 when the detent pin 62 is engaged in one or the other of the recesses 58 and 60. The detent block 28 here shown is generally rectangular in form, and the jaws 18 and 24 are adapted to be mounted on the sides 68 and 70 thereof (FIGURE 3). Threaded holes 72 and 74 (FIGURE 2) in the index block 28 accommodate screws (not shown) which hold the jaws 18 and 24 on the block 28.

As suggested, the cross pin 34 is wedged against the index block 28 to hold the same securely in either of the indexed positions. In this connection it will be observed that the cross pin 34 fits in a peripheral groove 76 in the plunger 32, and the projecting end portions of the pin are received in an axially elongated peripheral recess 78 in the spindle 30 (FIGURES 8 and 9). The index block 28, on the other hand, has two diametrically opposed internal recesses 80 and 82 (FIGURE 3) so arranged that one or the other of the recesses is opposite the cross pin 34 in each index position of the block.

It is a feature of the invention also that the plunger 32 is mounted in an axial bore 84 in and opening through the outer end of the spindle 30 and as shown in FIGURE 2, the bore is inclined or in acute angular relation to the axis of the spindle. A compression spring 86 confined in the bore 84 behind the plunger 32 urges the latter normally outwardly of the spindle 30 and in the particular arrangement shown the outer end of the spring is received in a socket 85 provided in the inner end of the plunger. A passage 87 vents the inner end of the bore 84 to atmosphere.

The bottom face of the peripheral recess 78 is disposed at the same angle with respect to the axis of the spindle as the bore 84 so that the projecting end portions of the locking pin 34 ride on the bottom of the recess 78 when the plunger 32 is slidably actuated in the bore. In this connection, it will be observed that the cross pin 34 is carried by and travels with the plunger 32 and it extends radially outwardly from the plunger (FIGURE 2) so that, in either index position of the block 28 the cross pin will enter one or the other of the axial slots 80 and 82. A locking effect of the cross pin 34 against the index block 28 is achieved by reason of the fact that the bottom faces of the slots 80 and 82 also are inclined with respect to the axis of the spindle 30 and are in outwardly tapered relation with respect to the bottom face of the longitudinal slot 78, as perhaps best shown by the broken lines extending to the left of these surfaces in FIGURE 2. Moreover, the taper angle and relative spacing between the bottom faces of the opposed slots is such that the cross pin 34 wedges against the bottom surface of the outer slot 80 or 82 as the case may be before it reaches the outer end of the peripheral slot 78.

Manifestly, the compression spring 86 maintains a constant force on the plunger 32 in use tending to move the latter outwardly in the spindle 30 and to wedge the cross pin 34 against the locking face of the slot 78 and the wedge surface of the opposing slot 80 or 82. Further, the taper angle of the two opposed surfaces is preferably such that the cross pin 34 wedges and locks thereagainst under the force exerted by the compression spring 86.

Satisfactory results were obtained in one embodiment of the invention when the plunger 32 was disposed at an angle of 10 degrees 30' with respect to the axis of the spindle 30 and the wedging faces of the slots 80 and 82 were disposed at an angle of 5 degrees 30' with respect to the axis of the spindle. Under these circumstances, the cross pin 34 effectively locked the index block 28 and held it fixed on the spindle 30 under all conditions of use.

It is a particular feature of the invention that the inner or forward portion of the bushing 50 overhangs the longitudinal peripheral slot 78 for at least a portion of its length, and the inner or rearward portion of the peripheral slot 78 is formed at opposite sides thereof with rails or abutments 88 and 90 (FIGURES 6–9) that embrace the ends of the cross pin 74 when the latter moves into the inner or rear portion of the slot as shown in FIGURE 6. As a result, the overhanging or overlapping portion of the bushing 50 and the abutments 88 and 90 mutually cooperate to prevent the pin 34 from inadvertently falling out of the slot 78 when the plunger 32 is depressed. If the cross pin 34 is not confined in some manner, it could, of course, become dislodged from the peripheral slot 78 by a sudden quick movement of the plunger 32 even though the cross pin is disposed on top of the plunger as illustrated in the drawing. However, the possibility of this contingency occurring, of course, is much greater if the index device is mounted or oriented differently than shown in the drawing. In some environmental situations, for example, it is necessary or desirable to mount the index device upside down from the position shown with the plunger 32 angling downwardly instead of upwardly in order to make the plunger more readily accessible or to position it for more convenient operation. Under these conditions, the pin 34 would be below the slot 78 and, if not retained, it would fall out of the slot when the plunger 32 is pushed in to release the index block 28.

From the foregoing, it will be readily apparent that the cross pin 34 can be released from the locked position by pushing the plunger 32 in against the action of the compression spring 86. As the plunger 32 moves inwardly from the locked position shown in FIGURE 2 to the partially released position shown in FIGURE 4 the cross pin 34 gradually releases pressure on the outer wedging surface of the index block 28, and by the time the plunger has been pushed all the way into the position shown in FIGURE 6, the cross pin is entirely disengaged from the index block. At this time the index block 28 can be easily turned on the spindle 30 to change the index position. Alternatively, release of the plunger 32 permits the compression spring 86 to project the plunger outwardly in the bore 84 and to insert the cross pin into whichever internal groove of the index block 28 is opposite the peripheral groove 78. As the cross pin 34 presses against the wedging surfaces of the index block 28 and the spindle 30, it first takes up any radial play between the relatively movable parts and then wedges solidly into the taper angle of the opposing surfaces engaged thereby to lock the index block fixedly and securely and against rotation on the spindle. These operations can be accomplished easily and quickly and little manual effort is required to actuate the plunger 32. On the other hand, mere release of the plunger is sufficient to fix the index block 28 on the spindle 30 and the locking action is positive and immediate.

Provision of the bushing 50 at the rear of the index block 28 assures full support for the index block and provides a large surface area of engagement between the parts when the cross pin 34 is locked in place. This in turn assures a positive holding action even though the parts are quite small in size. Also, the provision of the bushing 50 in combination with the front bearing provided by the inner flange 54 assures proper support for the index block 28 when it is rotated as well as when it is fixed or locked to the spindle 30. Manifestly, the inner flange 52 engages the index block 28 entirely around its circumference and thus provides support for the index block in all radial directions. This is significant in the case of the two position index block of the type here shown, but it is even more significant if more than two index positions are provided for the block 28. As shown in FIGURE 3, approximately half the surface of the opening 46 is left to provide a bearing for the index block 28 on the spindle 30 if the block has two index positions. However, if the index block 28 is formed with three internal slots instead of two, the area of surface contact between the block and the spindle 30 is greatly reduced. If four internal slots are provided in the index block 28, the area of surface contact between the block and the spindle 30 is reduced almost to the vanishing point. Thus, in the absence of the front bearing flange 52 if the index block 28 were provided with four internal grooves, each representing one of four index positions, there would be practically no support for the block ahead of the bushing 50. However, the provision of the front bearing flange 54 provides complete front end support for the index block 28 regardless of the number of internal slots or the number of index positions.

While index blocks having two, three and four index positions have been specifically referred to, it will be readily apparent that the index device of this invention can be designed to have more than four index positions simply by increasing the radial size of the parts. For example, if the diameter of the spindle 30 were doubled and the index block 28 correspondingly increased in size, but the plunger 32 and the cross pin 34 and the various parts and appurtenances that cooperate therewith are maintained the same size as shown in the drawing, there would be room for a greater number of internal slots in the index block and a corresponding increase in the number of index positions.

Having thus described the invention, I claim:

1. An index device comprising
   a mounting spindle
      provided with an axially elongated peripheral recess and an inclined axial bore;
   an index block
      mounted for rotation on said spindle having a plurality of circumferentially spaced, internal axially extending recesses each adapted in one index position of said block to be disposed opposite said peripheral recess;
   a plunger
      slidable in said bore;
   spring means
      in said bore behind said plunger normally urging the latter outwardly; and
   a cross pin
      carried by said plunger projecting into said peripheral recess and adapted to be received in a selected one of the internal recesses of said index block,
      said cross pin being movable in said peripheral recess by sliding movement of said plunger,
      the bottom faces of said internal and peripheral recesses tapering outwardly each with respect to the other whereby said spring means acting on said plunger normally wedges said cross pin in the taper angle of said recesses to lock said index block against rotation on said spindle.

2. An index device comprising
   a mounting spindle
      provided with an axially elongated peripheral recess and an inclined axial bore;
   an index block
      having a central opening receiving said spindle, said bore having a plurality of circumferentially spaced, axially extending, internal recesses each adapted in one index position of the block to be opposite said peripheral recess;
   a bushing
      in the inner end of said opening supporting the corresponding end of said index block for rotation on said spindle;
   means
      providing a separate bearing support on said spindle for the forward end of said index block ahead of said internal recesses;
   a plunger
      slidably mounted in the inclined bore of said spindle;
   spring means
      in said bore behind said plunger normally urging the latter outwardly; and
   a cross pin
      carried by said plunger projecting into said peripheral recess and adapted to be received in a selected one of the internal recesses of said index block,
      said cross pin being movable longitudinally in said peripheral recess by sliding actuation of said plunger,
      the bottom faces of said internal and peripheral recesses tapering outwardly each with respect to the other whereby said spring means acting on said plunger normally wedges said cross pin in the taper angle of said recesses to lock said index block against rotation of said spindle.

3. An index device comprising
   a mounting spindle
      provided with an axially elongated peripheral recess and an inclined axial bore;
   an index block
      having a central opening receiving said spindle, said opening having a plurality of circumferentially spaced, axially extending, internal recesses each adapted in one index position of said block to be opposite said peripheral recess;
   means
      providing a bearing support for said index block on said spindle behind said internal recesses;
   an annular bearing flange
      on said spindle snugly but rotatably fitting an annular recess in the front face of said index block and providing a separate bearing support for said block ahead of said internal recesses;
   a plunger
      mounted for longitudinal sliding movement in the inclined bore of said spindle;
   spring means
      in said bore behind said plunger normally urging the latter outwardly; and
   a cross pin
      carried by said plunger projecting into said peripheral recess and adapted to be received in a selected one of the internal recesses of said index block,
      said cross pin being movable longitudinally in said peripheral recess by sliding actuation of said plunger,
      the bottom faces of said internal and peripheral recesses tapering outwardly each with respect to the other whereby said spring means acting on said plunger normally wedges said cross pin in the taper angle of said recesses to lock said index block against rotation on said spindle.

4. An index device comprising
   a mounting spindle
      provided with an axially elongated peripheral recess and an inclined axial bore;
   an index block
      having a central opening receiving said spindle, said opening having a plurality of circumferentially spaced, axially extending, internal recesses each adapted in one index position of said block to be opposite said peripheral recess;

means
   providing separate bearing supports for said index block on said spindle behind and in front of said internal recesses;

a radially outwardly extending annular flange
   on said spindle overlaying the front face of said index block around said opening;

detent means
   in said block coacting with said flange to hold the block in selected indexed positions on the spindle with a predetermined one of said internal recesses opposite said peripheral recess;

a plunger
   slidably mounted in the inclined bore of said spindle;

spring means
   in said bore behind said plunger normally urging the latter outwardly; and a cross pin
   carried by said plunger projecting into said peripheral recess and adapted to be received in said predetermined one of the internal recesses of said indexed block,
   said cross pin being movable longtiudinally in said peripheral recess by axial sliding movement of said plunger in said bore,
   the bottom faces of said internal and peripheral recesses tapering outwardly each with respect to the other whereby said spring means acting on said plunger wedges said cross pin the taper angle of confronting recesses to lock said index block against rotation on said spindle.

5. An index device comprising
a mounting spindle
   provided with an axially elongated peripheral recess and an inclined axial bore;
an index block
   having a central opening receiving said spindle, said opening having a plurality of circumferentially spaced, axially extending, internal recesses each adapted in one index position of said block to be opposite said peripheral recess;
a bushing
   in said opening behind said internal recesses supporting the rearward end of said index block for rotation on said spindle and overlapping said peripheral recess at the forward end thereof;
means
   providing a separate bearing support for said index block on said spindle ahead of said internal recesses;
a plunger
   slidably mounted in the inclined bore of said spindle;
spring means
   in said bore behind said plunger normally urging the latter outwardly;
a cross pin
   carried by said plunger projecting into said peripheral recess and adapted to be received in a selected one of the internal recesses of said index block,
   said cross pin being movable longitudinally in said peripheral recess by slidable actuation of said plunger; and
abutments
   at the sides of said peripheral recess opposite the overhanging portion of said bushing confining and retaining said cross pin when said plunger is pushed inwardly against the action of said spring means,
   the bottom faces of said internal and peripheral recesses tapering outwardly each with respect to the other whereby said spring means acting on said plunger normally wedges said cross pin in the taper angle of said recesses to lock said index block against rotation on said spindle.

6. An index device comprising
a mounting spindle
   provided with an outwardly presented wedging surface;
an index block
   mounted for rotation on said spindle having a plurality of circumferentially spaced inwardly presented locking faces each adapted in one index position of said block to be opposite said wedging surface and each disposed at a taper angle with respect to said wedging surface;
a slidable plunger
   in and projecting from said spindle;
a cross pin
   carried by and movable with said plunger engageable with said wedging surface and a selected one of said locking faces to lock said index block against rotation on said spindle; and
means
   for holding said cross pin normally in pressed engagement with said wedging surface and said selected one of said locking faces.

7. An index device comprising
a mounting spindle;
an index block
   mounted for rotation on said spindle;
means
   for releasably locking said index block in any one of a plurality of rotatably indexed positions on said spindle including
a manually operable plunger
   mounted in and projecting from the end of said spindle; and
a locking element
   carried by and movable with said plunger engageable with said spindle and said index block to lock said index block against rotation on said spindle.

8. An index device comprising
a mounting spindle;
an index block
   mounted on and indexable around said spindle;
means
   for releasably locking said index block in any one of a plurality of rotatably indexed positions on said spindle including
a manual actuator;
a locking element
   carried by said actuator;
means
   holding said plunger normally positioned with said locking element wedged against said block to hold the latter in one of said indexed positions;
a bushing
   in said index block mounting the rear portion thereof for rotation on said spindle and cooperating with said spindle to confine said locking element when the latter is released from said index block; and
means
   providing a separate bearing support for the forward end of said index block on said spindle.

9. An index device comprising
a mounting spindle;
an index block
   mounted on and indexable around said spindle;
means
   for releasably locking said index block in any one of a plurality of rotatably indexed positions on said spindle including
a manual actuator;
a locking element
   carried by said actuator;
means
   holding said plunger normally positioned with said locking element wedged against said block to hold the latter in one of said indexed positions; and
a bushing
   in said index block mounting the rear portion thereof for rotation on said spindle, said bushing also surrounding said locking element when the latter is released from said index block and operative on such occasions to hold said locking element in operative association with said plunger.

10. An index device comprising
a mounting spindle
   provided with an outwardly presented wedging surface disposed at an acute angle to the axis of said spindle
an index block
   having an opening receiving said spindle, said opening having a plurality of circumferentially spaced, inwardly presented locking faces each adapted in one index position of the block to be opposite said wedging surface;
means
   for releasably locking said index block in any of said index positions including
a manual actuator
   slidable in said spindle at an acute angle to the axis of said spindle which is different than the angle of said wedging surface;
a locking element
   carried by said actuator and movable therewith into and out of engagement with said wedging surface and one of said locking faces opposite said surface; and
a bushing
   in said index block behind said locking faces mounting the rear portion of said block for rotation on said spindle and confining said locking element when the latter is out of wedging engagement with said block.

11. An index device comprising
a mounting spindle
   provided with an outwardly presented wedging surface;
an index block
   having an opening receiving said spindle, said opening having a plurality of circumferentially spaced inwardly presented locking faces each adapted in one index position of the block to be opposite said wedging surface;
means
   for releasably locking said index block in any of said index positions including
a manual actuator;
a locking element
   carried by said actuator and movable therewith into and out of engagement with said wedging surface and one of said locking faces opposite said surface;
a bushing
   in said index block behind said locking faces mounting the rear portion for rotation on said spindle and confining said locking element when the latter is out of wedging engagement with said block; and
means
   providing a separate bearing support for the forward end of said index block on said spindle ahead on said locking faces.

12. An index comprising
a mounting spindle
   provided with an outwardly presented wedging surface;
an index block
   mounted for rotation on said spindle having a plurality of circumferentially spaced, inwardly presented locking faces each adapted in one index position of said block to be disposed opposite said wedging surface;
a slidable plunger
   in and projecting from said spindle;
a cross pin
   carried by and movable with said plunger engageable with said wedging surface and a selected one of said locking faces to lock said index block against rotation on said spindle;
lateral abutments
   on said spindle cooperating with said cross pin to confine and retain the same when said plunger is positioned to disengage said pin from said index block; and
means
   for holding said cross pin normally in pressed engagement with said wedging surface and said selected one of said locking faces.

13. An index device comprising
a mounting spindle;
an index block
   mounted for rotation on said spindle;
means
   for releasably locking said index block in any one of a plurality of rotatably indexed positions on said spindle including
a manually operable plunger
   mounted in and projecting from the end of said spindle;
a locking element
   carried by and movable with said plunger engageable with said spindle and said index block to lock said index block against rotation on said spindle; and
lateral abutments
   on said spindle confining and retaining said locking element when the latter is moved by said plunger to release said index block.

14. An index device comprising
a mounting spindle
   provided with an outwardly presented wedging surface;
an index block
   having an opening receiving said spindle, said opening having a plurality of circumferentially spaced inwardly presented locking faces each adapted in one index position of the block to be opposite said wedging surface and each disposed at a taper angle with respect to said wedging surface;
means
   for releasably locking said index block in any of said index positions including
a manual actuator;
a locking element
   carried by said actuator and movable therewith into and out of engagement with said wedging surface and one of said locking faces opposite said surface;
a bushing
   in said index block behind said locking faces mounting the rear portion of said block for rotation on said spindle and overhanging a portion of said wedging surface; and
abutment means on said spindle opposite the overhanging portion of said bushing cooperating with said bushing to confine and retain said locking element when said actuator is positioned to release said pin from said index block.

15. An index device comprising
a mounting spindle
provided with an outwardly presented wedging surface;
an index block
having an opening receiving said spindle, said opening having a plurality of circumferentially spaced inwardly presented locking faces each adapted in one index position of the block to be opposite said wedging surface and each disposed at a taper angle with respect to said wedging surface;
means
for releasably locking said index block in any of said index positions including
a manual actuator;
a locking element
carried by said actuator and movable therewith into and out of engagement with said wedging surface and one of said locking faces opposite said surface;
a bushing
in said index block behind said locking faces mounting the rear portion of said block for rotation on said spindle and overhanging a portion of said wedging surface;
abutment means
on said spindle opposite the overhanging portion of said bushing cooperating with said bushing to confine and retain said locking element when said actuator is positioned to release said pin from said index block; and
means
providing a separate bearing support ahead on said locking faces for said index block on said spindle.

References Cited by the Examiner

UNITED STATES PATENTS

| | | | |
|---|---|---|---|
| 1,748,348 | 2/1930 | Hyatt | 74—813 |
| 2,531,198 | 11/1950 | Bruet et al. | 74—813 |
| 2,763,053 | 9/1956 | Anderson | 269—59 |

MILTON KAUFMAN, *Primary Examiner.*

BROUGHTON G. DURHAM, *Examiner.*